INVENTORS.
CLIFFORD J. BADER
RICHARD L. FUSSELL
ARTHUR G. BARNETT

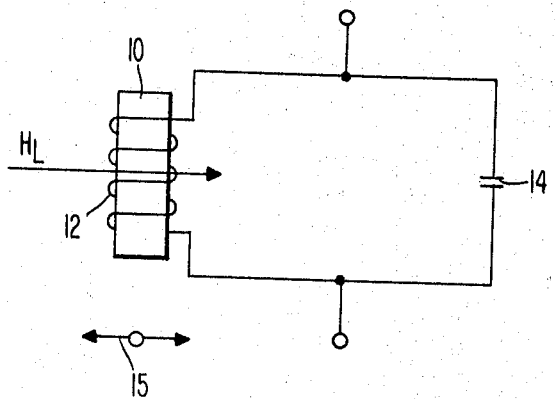
Fig.1
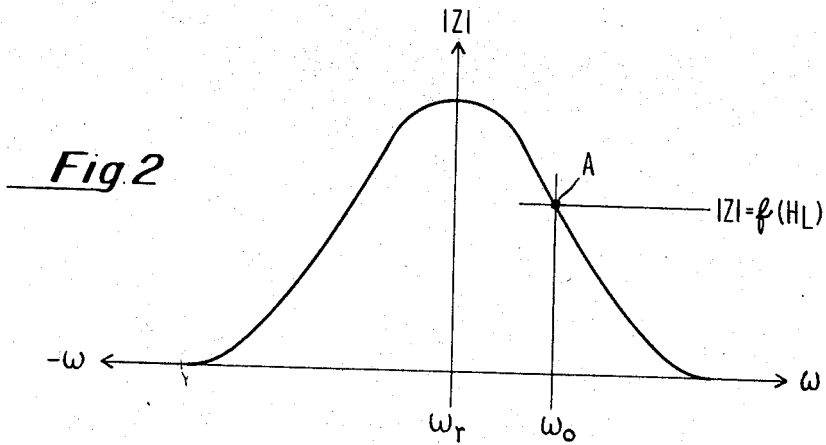
Fig.2
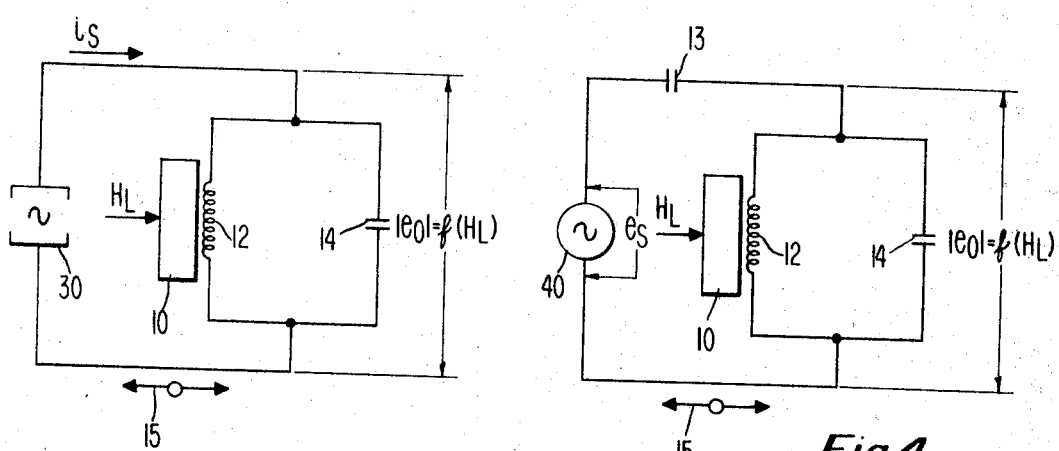
Fig.3
Fig.4

BY Francis A. Varallo
AGENT

United States Patent Office 3,443,213
Patented May 6, 1969

3,443,213
MAGNETOMETER USING THIN FILM TRANSDUCER AS SLOPE DETECTION FILTER
Clifford J. Bader, West Chester, Richard L. Fussell, Chester Springs, and Arthur G. Barnett, Proenixville, Pa., assignors to Burroughs Corporation, Detroit, Mich., a coporation of Michigan
Filed Apr. 18, 1966, Ser. No. 543,097
Int. Cl. G01r 33/02
U.S. Cl. 324—43      16 Claims

ABSTRACT OF THE DISCLOSURE

The present disclosure describes a thin magnetic film magnetometer system which utilizes radio-frequency slope detection techniques. In accordance with the invention, the thin film controlled inductor is placed in parallel with a capacitor to form a resonant tank circuit. When excited from a constant frequency source of alternating current, the tank circuit which is detuned from resonance at the source frequency provides an output voltage thereacross which is a function of the instantaneous impedance magnitude of the tank. This magnitude, in turn, is related to the external magnetic field environment to which the thin film element is subjected. Magnetic biasing and feedback methods applicable to the basic magnetometer are also described.

The present invention relates generally to magnetometers which utilize magnetic thin films in a nonswitching, inductance-variation mode, and more specifically to magnetometer systems in which said mode is exploited through the use of radio-frequency slope-detection techniques.

The basic thin magnetic film inductance variation mode of magnetometer transducer action has been described and claimed in copending application for U.S. patent, Ser. No. 449,183, entitled, "Magnetometer," filed Apr. 19, 1965, in the names of Richard L. Fussell and Clifford J. Bader, and assigned to the same assignee as the present application. In said copending application, the observation was made that there is a general need for a simple, mechanically rugged, compact, sensitive magnetic field sensing device which requires only minimal power consumption for operation. These advantages, it was demonstated, are realized by utilizing the dependence of the thin film permeability in a "hard" direction transverse to the preferred axis of magnetization of the film, on an applied field component along the film's preferred or "easy" axis. As taught and claimed in said copending application, if a winding is placed on the thin film element in such a manner that it links the thin film hard direction flux, the small signal inductance of the winding may be shown to be of the form $$L = L_A + K_1[H_K/(\bar{H}_x + H_K)]$$

where $L_A$ is the leakage (air) inductance
$K_1$ is a coupling and film flux coefficient
$\bar{H}_x$ is the applied steady-state easy direction field
$H_K$ is the film anisotropy field constant From the foregoing equation it can be seen that an approximately linear relationship exists between inductance change and field change, if the field change is not too large. Measurement of an ambient field may be accomplished by using the thin film inductance as part of a resonant tank circuit in conjunction with circuits which produce an output proportional to changes in the resonant frequency of the tank. Several methods are available to exploit the tank-circuit field dependent parameters. Two of these methods described in said copending application, involve respectively the direct detection of the phase changes which accompanying the tuning of a tank circuit through resonance and the measurement of frequency changes when the thin-film-controlled tank circuit is employed to control the frequency of an oscillator.

There is described and claimed in the present application a third method which involves a magnetometer system comprising a thin film transducer tank circuit employed as a slope-detection filter and excited from a constant frequency source. By this means, a very simple, low power, basic magnetometer sensor system, which yields highly predictable characteristics and a low transducer noise level, is attained.

It is therefore a general object of the present invention to provide an improved magnetometer system which utilizes simple low-power circuit techniques and rugged low-cost components.

Another object of the present invention is to provide a magnetometer system having a fairly high basic magnetic field to electrical signal conversion factor, and minimal electrical noise as a component of its output signal.

Still another object of the present invention is to provide a magnetometer system capable of being effectively interfaced with a wide variety of amplifiers and control systems for signal processing.

A further object of the present invention is to provide a thin magnetic film magnetometer system which will not be significantly disturbed by large magnetic field transients.

A still further object of the present invention is to provide a magnetometer sensor which employs circuits capable of being effectively compensated for output variation with temperature changes.

An important object of the present invention is to provide a sensor system which is compatible with a variety of feedback techniques that minimize dependencies on component and circuit drift, deviation and aging factors.

These and other features of the invention will become more fully apparent from the following description of the annexed drawings, wherein:

FIG. 1 is a pictorial representation of a tank circuit comprising the basic field sensitive transducer, the latter comprising a ferromagnetic thin film element and associated inductor winding.

FIG. 2 is a graph depicting the transducer tank circuit resonance curve.

FIG. 3 is an equivalent circuit configuration illustrating the transducer tank excited by a fixed-frequency constant current source.

FIG. 4 is another equivalent circuit illustrating the transducer tank excited by a fixed-frequency constant voltage source.

Figure 5:
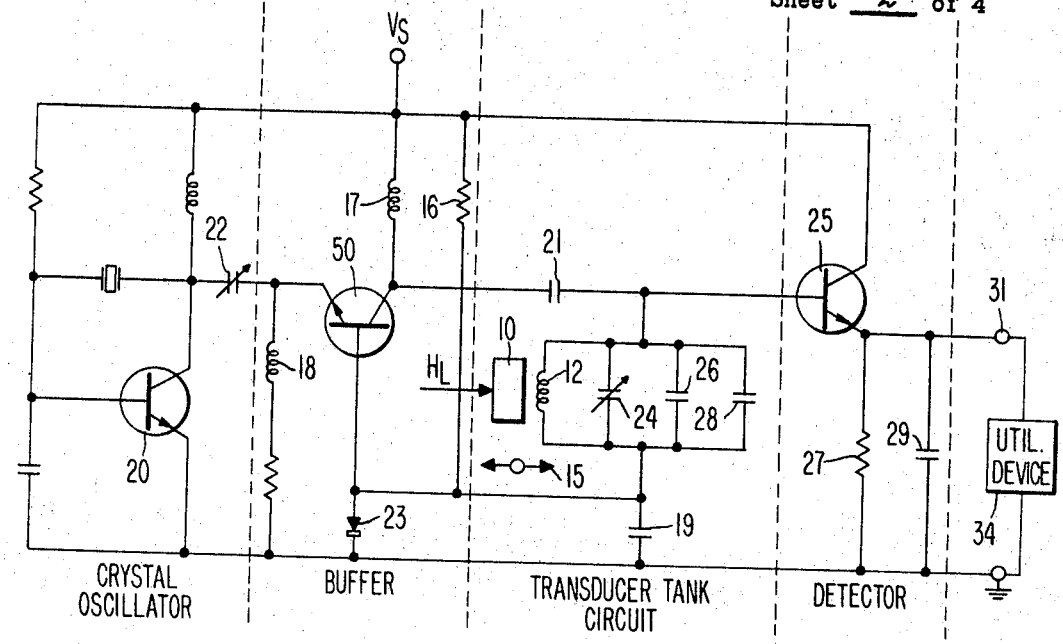
FIG. 5 is a schematic diagram of an operative basic buffered magnetometer sensor utilizing the slope detection mode in accordance with the present invention.

With reference to FIG. 1, if a winding 12 is placed around a thin magnetic film 10 in such a manner that the coil axis coincides with the hard direction axis of magnetization, the inductance is found to be dependent upon the static magnetic environment represented by field $H_L$ to which the film is subjected. The easy axis or preferred direction of the film is indicated by the double-headed arrow 15. When an RF exciting current caused to flow through winding 12 is maintained at a level which limits the perturbation of the film magnetization vector angle to a few degrees, and if the external fields, $H_L$ under observation are confined to values less than the anisotropy field $H_K$ or the coercive force $H_C$, the inductance variation is predictable and reversible.

Before proceeding with a detailed description of the present invention, it may be advantageous to consider briefly the nature of the magnetic films utilized in both the present invention and that of said copending application.

Thin magnetic films have been produced by depositing a nickel-iron alloy on a smooth substrate, such as glass, to a thickness of a few hundred to several thousand Angstroms. A number of deposition processes, including evaporation in a vacuum and electroplating may be employed. In the evaporative process the deposition of the magnetic material on a glass substrate may be made directly, whereas electroplating on a glass substrate requires the application of a conductive coating on the glass prior to deposition. In general, the characteristics discussed hereinafter apply to films deposited by either of these processes, although in electroplated films consideration must be given to the possible high-frequency eddy-current effects in the required conductive underlayer.

In general, predictable and stable magnetic properties of the films are obtained by choosing an alloy composition which yields minimum magnetostriction coefficient. For the nickel-iron film, the optimum composition appears to be approximately 83% Ni, 17% Fe. It has been found experimentally that if the actual composition of the films differs from this ratio by more than a few percent, the film magnetic properties are unduly sensitive to stresses induced by thermal expansion of the substrate or by external forces.

Films of thicknesses up to at least 3,000 Angstroms exhibit the capability of existing as a single domain, the magnetization of which can be rotated from a preferred or "easy" direction of magnetization by the application of external fields. This "easy axis" anisotropy is produced in the films by the presence of a large uniform field during the evaporation process which causes the magnetic domains of the alloy to align in a preferred directions.

The magnetic characteristic of thin films in the preferred direction exhibits a substantially rectangular hysteresis loop. In a direction transverse to the easy direction, often referred to as the "hard" direction or axis, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_C$ and $H_K$ are obtained. $H_C$ is the coercive field value (coercivity) evaluated from the rectangular hysteresis loop in the easy direction; $H_K$ is the anisotropy field or saturation magnetization force in the hard direction. As distinguished from rotation, magnetic thin films may also exhibit magentization reversal by domain wall motion in the presence of an easy direction applied field greater than the film coercive force, $H_C$. Single domains can only exist in these films if the size of the film spot is sufficiently large to keep the demagnetizing fields at the edges below the wall-motion threshold of, typically, one to two oersteds.

If a field is applied in the plane of the film perpendicular to the easy axis it is found that at a certain value of field strength the film magnetization in a given portion of the film is equally likely to return to the easy axis with positive and negative senses; consequently, the magnetization tends to split into multiple domains and the original single-domain state no longer exists until an easy-direction field exceeding $H_C$ is applied.

Returning to a consideration of FIG. 1, the thin film controlled inductor is placed in parallel with a capacitor 14, thereby yielding a tank circuit. As is well known, a simple parallel tuned L–C tank possesses an impedance magnitude [|Z|] which for a fixed capacitor and a fixed drive frequency depends entirely on the inductance magnitude. The magnitude of the tank circuit impedance will describe a peaked resonance curve in the region where the tank circuit resonance frequency approaches the drive frequency, as shown in FIG. 2. When the tank circuit resonant frequency ($\omega_r$) is slightly removed from the drive frequency ($\omega_o$) the resonance curve slope operating point identified as point A in FIG. 2 is realized and the impedance magnitude condition, |Z|, will vary as a function of inductance, L, and thus as a function of applied field ($H_L$). This relationship is set forth in the following analysis in which the mathematical considerations have been simplified by assuming that the operation takes place on the half-power point on the slope of the resonance curve, that is, the point at which the impedance magnitude has fallen to $$\frac{1}{\sqrt{2}}$$

times the resonant impedance.

The impedance of a parallel resonant circuit with $Q > 20$ is closely given by the normalized relationship $$\frac{|Z|}{R_o} = \frac{1}{\sqrt{1+4(\Delta\omega/B)^2}}$$

where $\Delta\omega/B$ represents the frequency deviation from resonance expressed as a fraction of the bandwidth, |Z| is the impedance at the frequency in question, and $R_o$ is the resonant impedance. At the half-power point $\Delta\omega/B = \frac{1}{2}$, and $$d\frac{|Z|}{R_o} \Big/ d\frac{\Delta\omega}{B} = \pm\frac{1}{\sqrt{2}}$$

the sign depending upon whether the deviation is to the low side or the high side of resonance. The bandwidth is $B = \omega_r/Q$, where $\omega_r$ is the resonant angular frequency. If Q is high, the half-power frequency $\omega_1$ does not differ greatly from $\omega_r$, and may be substituted for $\omega_r$ in the bandwidth expression.

Since the impedance $|Z_1|$ at the half-power point is $1\sqrt{2}$ times that at resonance, $$\frac{d(|Z|/|Z_1|)}{d(\omega/\omega_1)} \cong \pm\sqrt{2}(Q)\left(\frac{1}{\sqrt{2}}\right) = \pm Q$$

Since resonant frequency is inversely proportional to the square root of inductance, $d(Z/Z_1) = \pm 1/2(Q)(dL/L_1)$ represents the variation of impedance in the immediate vicinity of the half-power point. As an approximation, the transducer inductance may be given by $$L = L_A + K_1/(1+H_x)$$

where $L_A$ is the leakage air inductance, $K_1$ is a coupling and film-flux coefficient and $H_x$ is the applied steady state easy direction field divided by $H_K$, the anisotropy field. When the tank circuit is tuned so that the frequency of the driving current falls at the half-power point with zero $H_x$, then $L_1 = L_A + K_1$, and the fractional change $\Delta L/L_1$ produced by a small field $H_x$ is then $$\frac{\Delta L}{L_1} = \frac{L-L_1}{L_1} = -\frac{K_1}{L_A+K_1}\frac{H_x}{1+H_x}$$

Since $H_x \equiv \overline{H}_x/H_K$, the fractional impedance change produced by an applied field $\Delta \overline{H}_x$ is given by $$\frac{\Delta|Z|}{|Z_1|} = \frac{1}{2}\frac{Q}{H_K}\left(\frac{K_1}{L_A+K_1}\right)\Delta\overline{H}_x$$

Sensitivity is thus inversely proportional to film $H_K$, and varies linearly with tank Q and with the fraction of total inductance contributed by the film.

A representative calculation using the last equation is of interest. It has been found that, in a practical transducer, a Q of 50 may be attained, in conjunction with $K_1/L_A+K_1 \cong 0.15$. With $H_K=3$ oersteds, $$\frac{\Delta|Z|}{|Z_1|}\bigg/\Delta H_x = \pm\frac{1}{2}\left(\frac{50}{3}\right)(0.15) \cong 1.25/\text{oersted}$$

If the transducer is excited by an RF current which develops 1 volt peak across the tank terminals, an incremental sensitivity of 1.25 peak volts per oersted is achieved.

Although it appears from the foregoing analysis that identical performance is obtained on either the high- or low-frequency resonance-curve slopes, it has been found that better results are obtained if the transducer is tuned so that the actual resonant frequency is lower than the driving signal frequency. In this case, the increase in inductance produced by a negative $H_x$ moves the operating point further from resonance; this tends to decrease the slope of the impedance change per unit inductance change. Moreover, it has been shown that the rate of inductance change per unit field change increases for negative $H_x$. Thus, the two effects tend to cancel, and to extend the range over which an approximately linear relationship exists between field and impedance.

A second advantage appears in the practical case, where the RF excitation is not of infinitesimal amplitude. The detuning of the tank by a negative $H_x$ minimizes the magnetization vector RF excursion, which might otherwise destroy the single-domain state under the inherently less stable film conditions which exist with an opposing easy-direction field.

The basic tank circuit of FIG. 1 is again illustrated in FIG. 3 which also includes an equivalent fixed-frequency, $\omega_0$, constant current source 30 for driving the tank. The output voltage $e_o$ appearing across the tank is simply related to the tank circuit impedance by the relation $|e_o|=i_s|Z|$, where $i_s$ is the source current of frequency $\omega_0$ and $|Z|$ is the instantaneous impedance of the tank circuit for a particular applied field $H_L$. The output voltage $e_o$ is thus a function of the applied field $H_L$.

Analysis of the equivalent configuration shown in FIG. 3 using simple tuned circuit criteria, and with application of the thin-magnetic-film free-energy equation and the basic definition of inductance, shows that the voltage across the tank circuit, $e_o$ will be related to the applied magnetic field $H_L$ by the expression $$\frac{\Delta|e_o|}{\Delta H_L} \cong \text{Constant} \times \frac{Q}{H_K}\left(\frac{L_{t_o}}{L_A+L_{t_o}}\right)$$

for $\omega_r \to \omega_0$ and $Q>10$ where Q is the tank circuit net figure of merit, $H_K$ is the thin film anisotropy field constant, $L_{f0}$ is the film-contributed inductance for zero applied field, and $L_A$ is the stray "air inductance" of the coil.

In the configuration of FIG. 3, the output signal $e_o$ appearing across the tank circuit is a radio-frequency (RF) voltage having a magnitude dependent upon the magnetic field $H_L$. To obtain a DC output voltage related to the field conditions existing at the transducer tank, a radio frequency detector comprising a rectifier and a high pass filter is used to effect the conversion.

FIG. 4 illustrates an equivalent circuit configuration with functional properties identical to those of FIG. 3. FIG. 4, however, differs from FIG. 3 in that the transducer tank is excited by a fixed frequency $\omega_0$, constant voltage source 40 of amplitude $e_s$. A very small valued series coupling capacitor 13 is introduced between the source 40 and the tank circuit. For a fairly high Q tank circuit and corresponding low drive power requirement, it is possible to make the value of coupling capacitor 13 much smaller than that of the resonant capacitor 14. This criterion must be met in order for the circuit of FIG. 4 to function in a manner equivalent to the circuit of FIG. 3. As in FIG. 3 the output signal, $e_o$ is a function of the ambient easy direction field $H_L$.

Figure 6:
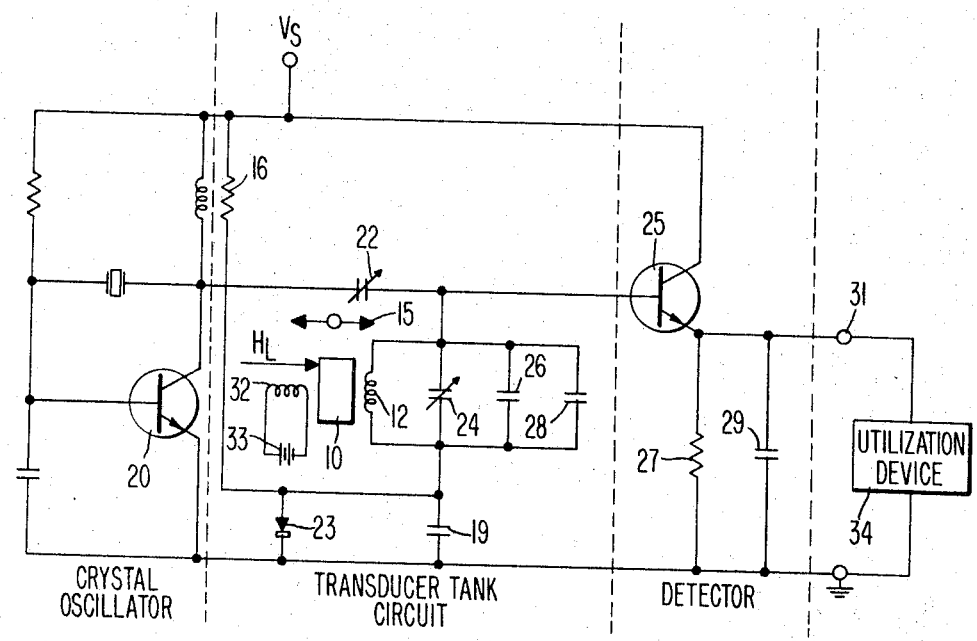
FIG. 6 is a schematic diagram of an operative basic magnetometer sensor simplified from the configuration of FIG. 5 in that no buffer stage is provided between the drive source and the tank circuit.

The schematic diagrams of FIGS. 5 and 6 represent actual circuit embodiments of the slope detection sensor modes considered hereinbefore in equivalent form. Briefly, the schematics include the RF drive, detection and amplification circuits necessary to provide efficient operation of the thin magnetic film transducer tank circuit. FIG. 6 differs from FIG. 5 in that the latter configuration includes a grounded base transistor buffer stage which may be incorporated where unusual system conditions might create additional loading effects on the oscillator. For normal applications, the circuit configurations of FIGS. 5 and 6 yield identical output characteristics and the following descriptions will be directed to both circuits unless otherwise noted.

In FIGS. 5 and 6, the reference source includes transistor 20 in a crystal controlled Pierce oscillator circuit operating fully class C in the 10 mHz. region. Starting bias is supplied by a large value of transistor 20 base pull-up resistance. In an unloaded state, and operating from a standard 2.7 volt supply, the oscillator has a current drain of approximately 80 microamperes, and an intrinsic power dissipation of 215 microwatts. Actually, the oscillator has been demonstrated to operate reliably with the supply voltage reduced to 1.5 volts and with a variety of transistor types. The frequency stability of the oscillator is entirely dependent on the crystal frequency drift characteristic, which may be approximately ±0.01% over the temperature range of −55° C. to +90° C.

As a result of class C operation the oscillator output voltage $e_{osc}$ appearing on the collector of transistor 20 is simply dependent on the transistor 20 saturation voltage $V_{ce}$ and the collector supply voltage $V_s$, that is $$e_{osc} = K_1[V_s - V_{ce}]$$

where $K_1$ is a constant which equals approximately $\sqrt{2}$ for the R.M.S. value of the oscillator output voltage.

The oscillator energy is coupled via a small variable capacitor 22, typically adjusted to approximately 1.5 pf., to the buffer stage input in FIG. 5, and directly to the transducer tank circuit in FIG. 6. The grounded base buffer stage comprising transistor 50 in FIG. 5 provides true constant-current drive by way of capacitor 21 to the parallel-tuned tank circuit in which the inductance element is the thin-film transducer comprised of the thin film 10 and inductor winding 12. Components 17 and 18 are RF chokes. The simplified configuration of FIG. 6 provides effectively the same functional result with significantly fewer components and appreciably less supply current drain. In FIG. 6 the capacitive reactance of coupling capacitor 22 is sufficiently large that the capacitor tends to create a current source drive for the tank, while providing a very high impedance load for the oscillator.

The transducer tank circuit of FIGS. 5 and 6 provides a magnetic field dependent impedance as described in detail hereinbefore. The tank circuit is tuned so that the exciting frequency falls on the slope of its resonance curve. As the inductance varies with the applied magnetic field, the RF voltage developed across the tank by the constant exciting current also varies.

The practical tank circuit includes a thin film element 10, a winding 12, and a group of capacitors connected in parallel. Variable capacitor 24 effects the principle tuning adjustment, while capacitor 26 provides temperature compensation and capacitor 28 operates as an additional fixed padder. Extensive analysis and testing of the thin film and its inductor winding package have established that the variable inductance component has a positive temperature coefficient. Capacitor 26 is selected to have a negative temperature coefficient in order to provide a net capacity change effectively cancelling the inductance temperature dependence.

The transducer coil winding has a resistance and thus a Q which is temperature dependent. Since the resonance curve amplitude depends on Q, it is desirable to provide a compensating effect for the Q change. The amplitude of the tank circuit resonance curve peak is linearly related to the drive current supplied from the oscillator via a buffer stage or directly by way of a coupling capacitor. Accordingly, any circuit technique which predictably controls or varies the tank circuit drive as a function of temperature will accomplish the desired compensating effect.

One technique employed in an actual operative embodiment of the present invention, is to create a temperature-dependent supply voltage for the oscillator by inserting an RF bypassed diode or thermistor network (not shown in FIGS. 5 and 6) in the oscillator DC supply line. Thus, the oscillator voltage level increases with increasing temperature and cancels the resonance curve peak decrease due to tank circuit Q change. It must be emphasized, that such compensation is necessary only in the most critical applications, where the uncompensated amplitude change of approximately 0.25% per degree centigrade cannot be tolerated.

Power consumption in the tank circuit proper is extremely low due to the fact that the capacitors, the inductor winding and the thin film itself all exhibit very low losses. Of course, the small-signal nonswitching operation of the uniformly magnetized, coherent-rotational thin film is a key factor to the low-loss conditions. In practice a power requirement of 100 to 200 microwatts exists for the tank circuits so that a minimal drive level is also required.

The very low energy loss in the film and inductor also indicates very low noise generation in the transducer component. Calculations indicate that a useful slope detection signal-to-noise ratio exists for magnetic field changes as small as 5 milligamma ($5 \times 10^{-8}$ oersted) with 1 Hz. pass band. Experimental results have shown no significant noise contribution from the film at magnetic field signal levels of 1 gamma ($10^{-5}$ oersted).

Conversion of the magnetic field dependent RF signal magnitude to a DC output level is finally achieved by high impedance detection in each of the configurations of FIGS. 5 and 6. The high impedance is necessary so as not to degrade the characteristics of the tank circuit. Transistor 25 of the detector is connected as an emitter follower and is driven by the RF voltage appearing across the tank circuit. The output filter capacitor 29 charges to a level determined by the peak positive RF voltage, and since the RC time constant determined by resistor 27 and capacitor 29 is much longer than a single RF cycle, the voltage across capacitor 29 does not decrease significantly during the negative portion of the cycle. Thus transistor 25 is driven to conduction only near the positive RF peak, and a DC voltage is maintained at the output terminal 31 which is linearly related to the RF tank voltage. In addition to serving as a rectifier, transistor 25 provides current gain so that there is no appreciable loading of the tank circuit. An output utilization device 34, which in its simplest form may be a galvanometer, is shown connected to terminal 31.

The detector stage is substantially independent of supply voltage variations, provided that the signal levels are well below the supply voltage $V_s$ amplitude. Moreover, the emitter-follower configuration of transistor 25 results in a fairly low basic sensor output impedance. This transistor stage does exhibit one temperature dependent variable which requires compensation, namely, the base-to-emitter voltage, $V_{be}$, which has a direct effect on the output signal. In the schematics of FIGS. 5 and 6 the variable $V_{be}$ term of transistor 25 (and also transistor 50 in FIG. 5) is effectively cancelled by placing a forward biased compensating diode 23, at the bottom of the transducer tank. That is, the voltage drop across diode 23 effectively opposes and nullifies the voltage, $V_{be}$. In an actual operating circuit, a diode current of approximately 50 microamperes derived from souce $V_s$ and flowing through resistor 16 was found to give satisfactory compensation for $V_{be}$. Although the diode voltage drop represents a power loss, it has the advantage of causing more nearly class B operation of the detector stage (and the buffer stage in FIG. 5) which results in decreased transducer drive requirements that entirely offset the current drain of diode 23. Capacitor 19, connected in parallel with diode 23, serves to bypass the RF signal directly to ground.

Specific characteristics and parameters for an actual operative embodiment of the invention in accordance with FIGS. 5 and 6 are as follows:

I. Variable inductance transducer

Thin-film characteristics: 1,000 A. to 3,000 A. thick, 0.8″ x 0.8″ film spot.

Inductor winding: 22 turns of #26 wire cast in high silica epoxy. Flattened cross section with coil dimensions of 1.02″ x 0.8″ x 0.06″ ID.

Net transducer characteristics:
L=1.55 to 1.80 $\mu$hy
Q=50 to 55
T.C.=+100 p.p.m./°C.

II. Magnetometer sensor characteristics

| | |
|---|---|
| Supply voltage | +2.75 v. DC. |
| Current drain | |
|   Buffered sensor | 400 $\mu$a. |
|   Simplified sensor | 150 $\mu$a. |
| Tank circuit peak voltage | 2.0 v. RF peak. |
| Slope tuning point | 1.5 RF peak. |
| Small field change for output sensitivity | 1.0 v./oersted to 3.0 v./oersted. |
| Output impedance | 1.0 to 2.0K ohms. |
| Magnetization stability range | +75% of $H_C$ (±1.0 to 2.0 oersteds). |

Useful dynamic range: Sensitivity x field product of 1.0 volt.

It should be emphasized that the foregoing dimensions and amplitudes may vary according to the material, design or application, and are included solely for purposes of examples, and should in no way be considered limitative of the invention as described and claimed herein.

As is well known, the magnetic thin film transducer is capable of being magnetized in either of two stable remanent states, and can be disturbed by large transient fields in excess of the coercive force $H_C$. Practical applications of the present magnetometer require concern with the maintenance and/or re-establishment of the desired single domain condition.

In maintaining the single domain condition of the magnetic thin film, the demagnetizing effects of the film itself must be taken into consideration. It has been found that the use of a relatively large film spot size reduces the demagnetizing effects to the point of minimal significance. This means that once magnetized, a film will perform with complete reliability for an indefinite period in a magnetic field environment which does not include fields exceeding the switching or demagnetizing field levels.

Figure 7:
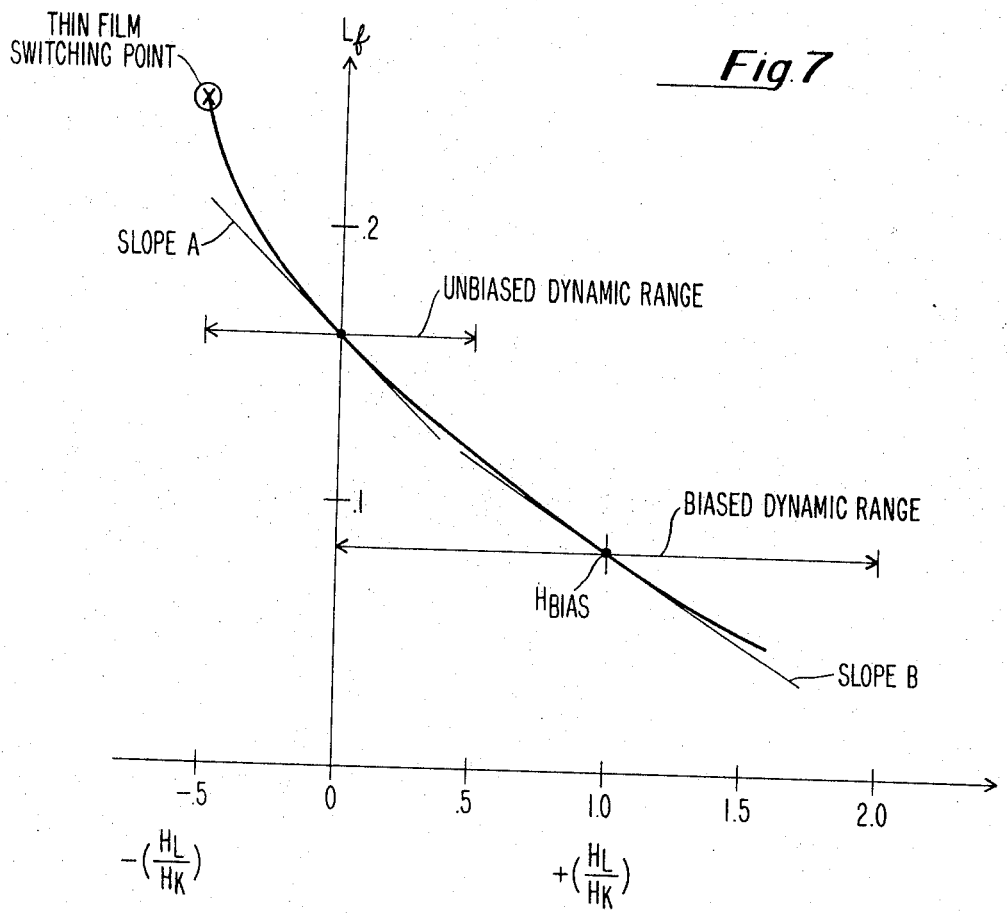
FIG. 7 is a graph of the thin magnetic film inductance plotted against the applied easy direction magnetic field.

The magnetic field dynamic range is generally limited by the $H_C$ parameter of the thin film which corresponds to the reverse easy-direction field square loop switching level. FIG. 7 illustrates both this last condition and the attendant dynamic range. In FIG. 7, $L_f$ the inductance of the magnetic thin film in microhenries is ploted as a function of the applied easy direction field expressed in normalized units resulting from the expression $H_L/H_K$, that is, the applied field in oersteds, divided by the film anisotropy field in oersteds. If a magnetic field dynamic range or transient field condition greater than the prescribed level are indicated possibilities, the basic sensor described hereinbefore must be modified accordingly.

An extremely simple and very practical solution to the problem of excessive field levels, is the magnetic biasing of the thin film element. Thus, a constant field greater than the combined film coercivity $H_C$ and the worst-case reverse dynamic range condition, a field $-\overline{H}_L$, is applied in the direction of film magnetization. This may be expressed, $H_{bias} \geq \overline{H}_C + \overline{H}_L$.

The graph of FIG. 7 illustrates that the application of magnetic bias significantly increases the dynamic range of the film, although at the expense of an approximately 50% reduction in basic sensitivity as indicated by slopes A and B, which represent the unbiased and biased conditions respectively. The constant bias field has the added advantage of restoring the original magnetic condition of the film at the termination of any strong transient field which may have disturbed the film magnetization.

The constant bias field may be provided in various ways. FIG. 6 illustrates schematically a field coil 32 and current source 33 which in practice may include a winding wrapped around the transducer assembly, carrying a constant current, and oriented to provide magnetic flux in the film easy direction, 15. Alternately, the bias field may be provided by permanent magnets.

The simple basic sensor circuits discussed hereinbefore are complete functional magnetometers in themselves. However, practical applications generally require additional circuit structure for amplification, interfacing and operational predictability. It has been found that the use of feedback techniques provides stable magnetometer and amplifier performance with non-critical component and supply requirements. Such feedback techniques are directly compatible with the thin film slope-detection sensors of FIGS. 5 and 6.

Figure 8:
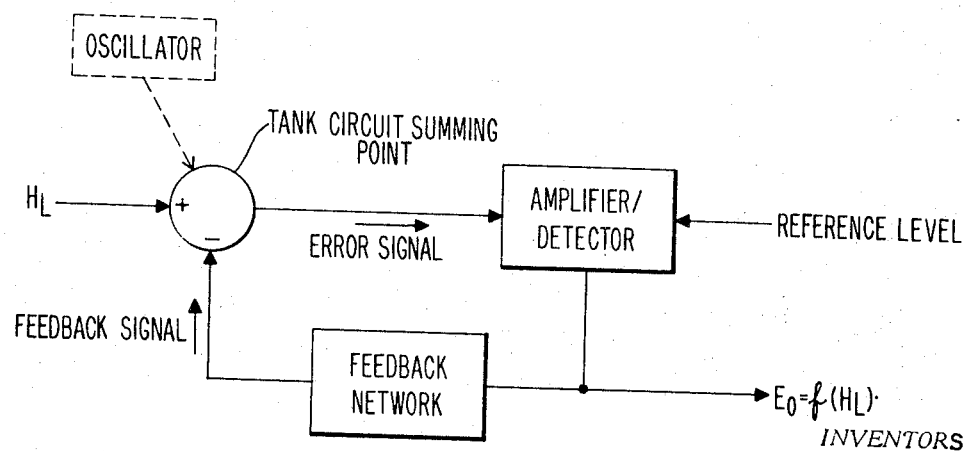
FIG. 8 depicts in block form a generalized magnetometer feedback system.

FIG. 8 illustrates the functional block configuration of a generalized magnetometer feedback system. It should be noted that the transducer tank circuit of the sensor becomes the system summing point at which the ambient field $H_L$, oscillator drive and feedback signals are combined. Further, it becomes apparent that several methods of feedback control are directly compatible with the slope detection magnetometer technique. These methods include DC voltage feedback control, capacitive correction feedback control and field nulling feedback control which are illustrated respectively in FIGS. 9 through 11 inclusive.

Figure 9:
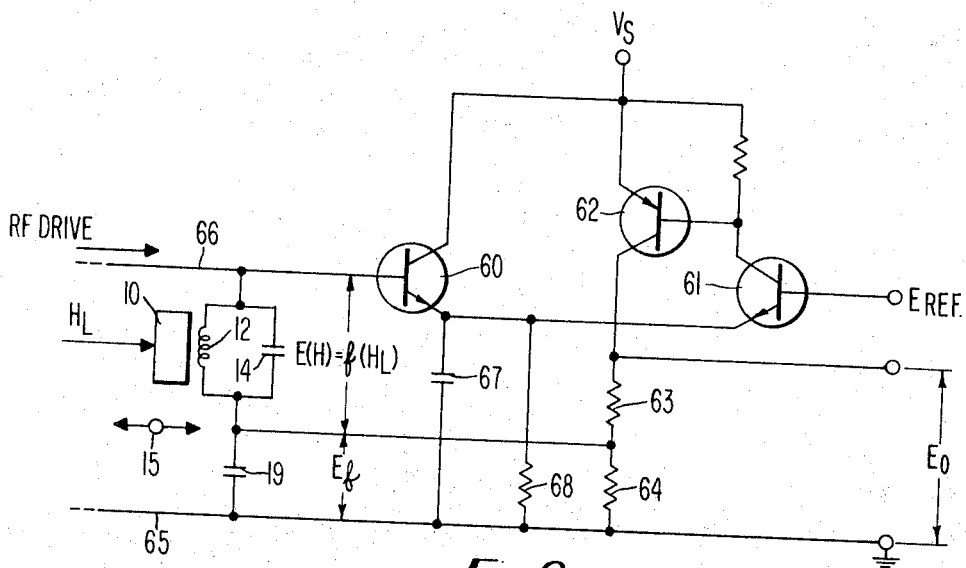
FIG. 9 is a schematic diagram illustrating the use of D-C voltage feedback in the magnetometer sensor.

FIG. 9 illustrates a useful circuit configuration embodying a number of important principles and depicting the use of DC voltage feedback. Line 66 shown dashed at its extremity implies a connection either directly to the crystal oscillator via capacitor 22 as in FIG. 6, or a connection via capacitor 21 to the collector of the buffer stage transistor 50 in FIG. 5, which latter stage is connected to the crystal oscillator via capacitor 22. Line 65 is merely the extension of the ground connection. This circuit utilizes a difference amplifier comprising transistors 60, 61 and 62 for the basic feedback system comparison and provides a large, open-loop gain. Transistor 62 is included to provide additional gain and circuit flexibility. One side of the difference amplifier, transistor 60 also serves as the high impedance RF detector with filter components 67 and 68, thus providing efficient component utilization and component symmetry for thermal balance. The amplifier output occurs across the divider network consisting of resistors 63 and 64 so that the feedback point at the junction of said last resistors directly influences and predictably controls the overall amplifier gain.

For analytical purposes the transducer tank circuit RF voltage magnitude may be treated as being an equivalent DC level [E(H)] corresponding to the detected voltage. By virtue of the feedback, the sum of the voltage derived from the output divider ($E_f$) appearing across resistor 64 plus the tank circuit equivalent DC voltage [E(H)] is always corrected to balance the difference amplifier against the reference voltage ($E_{ref}$). Thus, $$E_f + E(H) = E_{ref}$$

Since $$E_f = E_o \times \frac{R_3}{R_2 + R_3}$$

by divider action the output voltage may be expressed as $$E_o = [E_{ref} - E(H)] \frac{R_2 + R_3}{R_3}$$

For a changing magnetic signal $\Delta H$, the output signal is $$\frac{\Delta E_o}{\Delta H} = \left(\frac{-\Delta E(H)}{\Delta H}\right)\left(\frac{R_3 + R_2}{R_3}\right)$$

Figure 10:
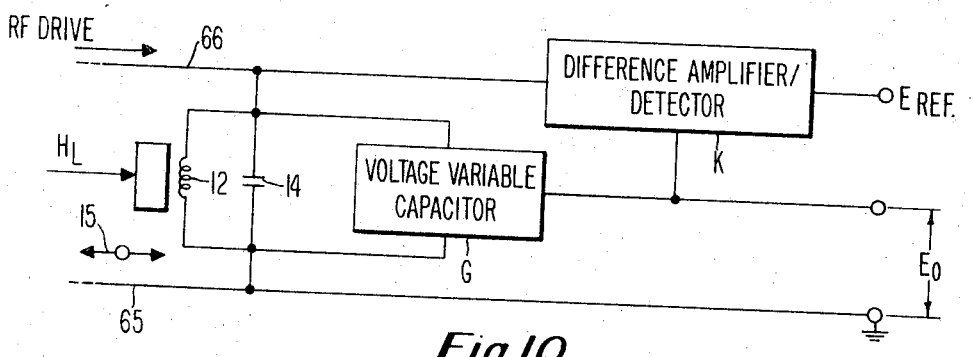
FIG. 10 is a combination block diagram and circuit schematic illustrating the use of a capacitive tuning correction feedback system for incorporation in a magnetometer system.

Another useful feedback method illustrated in FIG. 10 uses the capacitive retuning effect available from a voltage controlled variable capacitor, known also as a varicap diode, or equivalent device. This method corresponds to automatic frequency control circuits found in many radio receivers and transmitters. A combination block diagram and circuit schematic is shown in FIG. 10 where the amplifier/detector section designated K for its transfer characteristic may be similar to that previously described for the voltage feedback case. Connections for lines 65 and 66 are the same as those described for the like numbered lines of FIG. 9. In the capacitive retuning method the resonance curve slope detection operating point is held substantially constant since the capacitive retuning of the tank circuit acts to maintain the tank circuit resonant frequency constant by cancelling the effect of the thin film magnetometer inductance change. The output signal voltage $E_0$ is thus seen to be the voltage level or change required to readjust the tank circuit by way of the variable capacitance device designated, G. Hence, the system forward gain is entirely dependent upon the transfer characteristics of that device. Expressed analytically, $$\frac{\Delta E_o}{\Delta H_L} = (\text{CONSTANT}) \frac{K}{1 + GK} \text{ for } K \gg 1$$

$$\frac{\Delta E_o}{\Delta H_L} = \frac{\text{CONSTANT}}{G}$$

Figure 11:
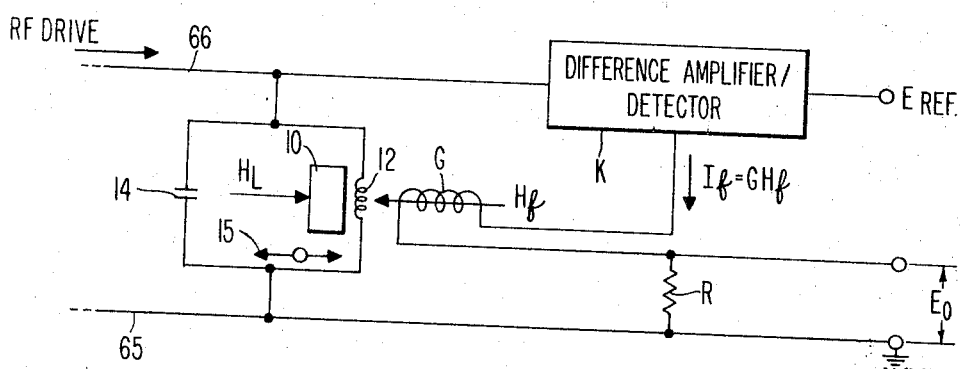
FIG. 11 is another block diagram-circuit schematic depicting a magnetometer feedback configuration utilizing a correction field coil.

The final signal feedback configuration illustrated by FIG. 11 is in some ways the most precise and accurate in terms of more demanding magnetic field measurements. This configuration may also employ the difference amplifier/detector K of FIG. 9 and connections to lines 65 and 66 are identical to those of FIG. 9. In this case a feedback current ($I_f$) is applied to a correction field generating solenoid designated G for its feedback transfer function to provide a bucking field ($H_f$) along the thin film inductor axis of sensitivity, that is the easy axis 15. By feedback and difference amplifier action, the magnetic feedback system of FIG. 11 then seeks a condition where $H_f = H_L$ where the last term is the external field under observation. Because the feedback mechanism is itself a field ($H_f$) and because the thin film is always maintained at the same magnetic condition, it follows that this last approach will produce the most ideal measurement results. Thus for FIG. 11, if $K \gg 1$ then $$H_f = H_L$$
$$I_f = GH_L$$
$$E_o = RGH_L = (\text{CONSTANT})H_L$$

Expressed another way, the output voltage $E_o$ is equal to the voltage drop across R caused by the current $I_f$.

It will be apparent from the foregoing description of the invention and its mode of operation that there is provided an improved thin magnetic film magnetometer system which utilizes slope-detection techniques. Moreover the basic system is further refined through the use of magnetic biasing and various feedback methods.

What is claimed is:

1. A magnetometer comprising ferromagnetic material capable of assuming opposed states of residual flux density along a preferred axis of magnetization, said material being magnetized substantially in a predetermined one of said states and existing substantially as a single large domain of said predetermined state, winding means inductively coupled to said material and being so disposed therewith as to link the magnetic flux of said material in a direction transverse to said preferred axis, capacitive means connected in parallel with said winding means and forming therewith a tank circuit, a source of fixed frequency alternating current, said tank circuit being adapted to be energized from said source of alternating current controlled in amplitude such that the magnetization of said material is disturbed but not permanently altered instate, said ferromagnetic material and said winding means comprising a total inductance having a value dependent upon the external field environment to which said material is subjected along its preferred axis of magnetization, said tank circuit being detuned from resonance at the frequency of said source of alternating current, the impedance magnitude of said tank circuit being a function of the value of said total inductance and being therefore a function of the magnitude of the field present in said external environment, the signals derived from said alternating current source and appearing across said tank circuit being of the same frequency as said source but varying in amplitude in response to changes in said tank circuit impedance magnitude as indicative of variations in said external field environment.

2. A magnetometer as described in claim 1 further characterized in that said ferromagnetic material is a thin film of nickel-iron alloy having a thickness of not more than 5000 Angstrom units.

3. A magnetiometer as defined in claim 1 further characterized in that in the absence of an external field environment, the operating point for the magnetometer is selected such that the frequency of said alternating current source occurs at the half-power point on the slope of the tank circuit resonance curve.

4. A magnetometer system comprising a ferromagnetic thin film element capable of assuming opposed states of residual flux density along an easy direction of magnization, said element being magnetized substantially in a predetermined one of said states, said element acting substantially as a single large domain of said predetermined state, an inductor winding disposed about said element in such a manner as to link the thin film element magnetic flux in the hard direction of magnetization, capacitive means connected in parallel with said thin film element inductor winding and forming therewith a parallel resonant tank circuit, a source of radio frequency current, said tank circuit being adapted to be energized from said source of radio frequency current controlled in amplitude so as to limit the perturbation of the magnetization of said element to small angular rotations incapable of altering said single domain configuration, said film element and said inductor winding comprising a total inductance having a value dependent upon the external magnetic field environment to which said element is subjected along its easy direction of magnetization, said radio frequency current having a preselected fixed frequency removed from the range of resonant tank circuit frequencies determined by said external field environment, the impedance magnitude of said tank circuit being a function of the value of said total inductance and consequently being a function of said external field environment, the signals derived from said radio frequency source and appearing across said tank circuit being of the same frequency as said source but varying in amplitude in response to changes in said tank circuit impedance as indicative of variations in said external field environment.

5. A magnetometer system as defined in claim 4 further characterized in that said thin film element is a nickel-iron alloy composed substantially of 83% nickel and 17% iron, and having a thickness of approximately 2000 Angstrom units.

6. A magnetometer system as defined in claim 4 further characterized in that said capacitive means comprises the parallel combination of a variable tuning capacitor, a capacitor having a predetermined temperature coefficient and a fixed padder capacitor.

7. A magnetometer system as defined in claim 4 further including a buffer stage interposed between said radio frequency current source and said tank circuit, said buffer stage comprising a transistor connected in a grounded base circuit configuration for providing constant current drive excitation for said tank circuit.

8. A magnetometer system as defined in claim 4 further characterized in that said source of radio frequency current comprises a transistor connected in a crystal controlled Pierce oscillator circuit having a fixed frequency of approximately 10 mHz.

9. A magnetometer system as defined in claim 4 further including a capacitor for coupling said radio frequency current signals from said source thereof to said tank circuit, said capacitor having a value of capacitive reactance such that a constant current drive excitation is created for said tank circuit and a high impedance load is provided for said source of radio frequency current.

10. A magnetometer system as defined in claim 4 further including a detector comprising a transistor connected in an emitter follower circuit configuration and a filter comprising a resistor and a capacitor connected in parallel, said detector being coupled to said tank circuit whereby said signals of radio frequency appearing thereacross are converted to DC output levels indicative of said external magnetic field environment, and a utilization device coupled to said detector.

11. A magnetometer system as defined in claim 4 further including means for applying a bias magnetic field to said thin film element, the magnitude of said bias field being equal to or greater than the sum of the coercivity of said element and the expected maximum reverse dynamic range condition imposed by said external magnetic field environment.

12. A magnetometer system as defined in claim 4 further including feedback means comprising a difference amplifier/detector, said difference amplifier/detector having an input stage, a reference stage and an output stage, said input stage being operatively connected to said tank circuit for receiving the radio frequency signals appearing thereacross, said input stage including filter means for converting said radio frequency signals to corresponding DC voltage levels, said reference stage being operatively connected to said input stage and being coupled to a source of reference potential, said output stage being operatively connected to said reference stage and including an output impedance.

13. A magnetometer system as defined in claim 12 wherein each of said difference amplifier/detector stages is a transistor having an emitter, a collector and a base electrode, the base electrode of the input stage transistor being connected to said tank circuit for receiving the signals appearing thereacross, the base electrode of the reference stage transistor being connected to a source of reference potential, the respective emitter electrodes of said input and reference stage transistors being connected to each other, the respective collector electrodes of said input and reference stage transistors being coupled to a source of supply potential, said filter means comprising the parallel combination of a resistor and a capacitor connected between the common emitter electrodes of said input and reference stage transistors and ground potential, the emitter electrode of the output stage transistor being connected to said source of supply potential, the base electrode of said output stage transistor being connected to the collector electrode of said reference stage transistor, and the collector electrode of said output stage transistor being connected by way of said output impedance to ground potential.

14. A magnetometer system as defined in claim 12 wherein said output impedance comprises a pair of series-connected resistors, a portion of the signal provided across said resistors by said output stage of said difference amplifier/detector and appearing at the common point of said resistors being fed back into said tank circuit, the output signal of the magnetometer system appearing across said output impedance.

15. A magnetometer system as defined in claim 12 wherein said feedback means includes a voltage variable capacitor connected in parallel with said tank circuit capacitive means, the signal provided across said output impedance by said output stage of said difference amplifier/detector being fed back to said voltage variable capacitor to vary the effective capacitance thereof in response to said external magnetic field environment, the output signal of the magnetometer system appearing across said output impedance.

16. A magnetometer system as defined in claim 12 wherein said feedback means includes a correction field generating solenoid positioned in close proximity to said thin film element, the signal provided across said output impedance by said output stage of said difference amplifier/detector being applied to said solenoid for generating a magnetic field directed along the easy direction of magnetization of said film element and opposed to the magnetic field present in said external environment, a resistor connected in series with said solenoid, the output signal of the magnetometer system appearing across said resistor.

References Cited

UNITED STATES PATENTS

| | | | |
|---|---|---|---|
| 3,239,754 | 3/1966 | Odom et al. | 324—47 |
| 3,271,665 | 9/1966 | Castro et al. | 324—43 |

RUDOLPH V. ROLINEC, *Primary Examiner.*

A. E. SMITH, *Assistant Examiner.*

U.S. Cl. X.R.

340—75, 174, 197

UNITED STATES PATENT OFFICE
CERTIFICATE OF CORRECTION

Patent No. 3,443,213                           May 6, 1969

Clifford J. Bader et al.

It is certified that error appears in the above identified patent and that said Letters Patent are hereby corrected as shown below:

Column 4, line 50, "$1\sqrt{2}$" should read -- $1/\sqrt{2}$ --; line 56, "$d(Z/Z_1$" should read -- $d(|Z|/|Z_1|$ --; line 71, "$H_x \equiv \bar{H}_x/H_K$" should read -- $H_x = \bar{H}_x/H_K$ --.

Signed and sealed this 17th day of March 1970.

(SEAL)
Attest:

Edward M. Fletcher, Jr.                      WILLIAM E. SCHUYLER, JR.
Attesting Officer                                 Commissioner of Patents